United States Patent Office 3,122,536
Patented Feb. 25, 1964

---

3,122,536
MORPHOLINE HEXAFLUOROARSENATE
Hugh T. Harrison, Midland, Mich., assignor to The Dow Chemical Company, Midland, Mich., a corporation of Delaware
No Drawing. Filed June 4, 1962, Ser. No. 199,622
1 Claim. (Cl. 260—242)

The present invention is directed to the novel compound morpholine hexafluoroarsenate. The compound corresponds to the formula:

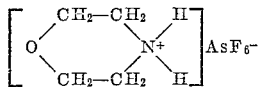

The present compound is a white crystalline material, of low solubility in organic solvents and of moderate solubility in water. It is useful as a parasiticide, and is adapted to be employed in the control of insect, bacterial and fungal pests, such as *Musca domestica* (house fly).

The novel compound can be prepared by reacting together morpholine and hexafluoroarsenic acid. Conveniently, the reaction is carried out in an inert liquid reaction medium, such as water. Good results are obtained when substantially equimolecular proportions of the reactants are employed. The reaction is exothermic and takes place smoothly at temperatures of from 15° to 50° C.

In carrying out the reaction, the morpholine is contacted with the hexafluoroarsenic acid in any conventional manner. The contacting is conveniently carried out by adding one reactant to the other reactant. Oftentimes it is convenient to employ a hydrate form of the acid reactant. The temperature of the resulting reaction medium can be controlled by regulating the rate of the contacting of the reactants as well as by external cooling. Sometimes the desired product precipitates in the mixture during the reaction. Where desirable to maintain fluid condition such product can in part be separated by conventional procedures. Upon completion of the contacting of the reactants, most of the reaction will have taken place with the production of the desired product. Where optimum yields are desired, it is often convenient that the reaction mixture be allowed to stand several hours to insure substantial completion of reaction. Upon completion of the reaction, the solvent can be removed from the reaction mixture by evaporation or distillation under reduced pressure to obtain the salt product as a residue. This product can be further purified by conventional procedures such as washing with water or suitable organic liquid and recrystallization.

In a representative operation, twenty milliliters (0.23 mole) of morpholine are added portionwise and with stirring to 100 grams of hexafluoroarsenic acid monohydrate (0.48 mole). The addition is carried out over a period of thirty minutes and at room temperature. Upon completion of the addition, the reaction mixture is cooled to a temperature near to 0° C. and the cooled reaction mixture filtered to obtain the morpholine hexafluoroarsenate product as a residue. This product is found to melt at from 212° to 216° C. with decomposition.

The present compound is useful as a parasiticide in various insecticidal, nematocidal and antimicrobial compositions. For such use, the unmodified compound can be employed. However, the present invention also encompasses the use of the compound together with a parasiticide adjuvant. In such use, the compound can be dispersed upon a finely divided solid and the resulting preparation employed as a dust. Also, such a mixture can be dispersed in water with the aid of a wetting agent and the resulting aqueous suspension employed as a spray. In other procedures, the product can be employed as a constituent of organic liquid compositions, oil-in-water or water-in-oil emulsions or water dispersions with or without the addition of wetting, dispersing or emulsifying agents.

In representative operations, aqueous compositions containing 4000 parts by weight of the subject compound per million parts of composition give substantially complete controls of plum curculio.

I claim:
Morpholine hexafluoroarsenate.

No references cited.